United States Patent
Nguyen

(10) Patent No.: US 7,440,553 B2
(45) Date of Patent: Oct. 21, 2008

(54) APPARATUS AND METHOD FOR CHECKPOINTING A HALF-CALL MODEL IN REDUNDANT CALL APPLICATION NODES

(75) Inventor: Hai Duong Nguyen, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 641 days.

(21) Appl. No.: 11/029,926

(22) Filed: Jan. 5, 2005

(65) Prior Publication Data

US 2005/0169435 A1    Aug. 4, 2005

Related U.S. Application Data

(60) Provisional application No. 60/542,197, filed on Feb. 4, 2004.

(51) Int. Cl.
*H04M 3/22* (2006.01)
(52) U.S. Cl. ............ 379/9.05; 379/114.28; 379/221.08; 709/227
(58) Field of Classification Search ............ 379/221.08, 379/9.07, 114.28; 709/227
See application file for complete search history.

(56) References Cited

U.S. PATENT DOCUMENTS 5,235,700 A   8/1993  Alaiwan et al.
5,802,267 A   9/1998  Shirakihara et al.
6,745,339 B2  6/2004  Shoaib et al.
2004/0006624 A1*  1/2004  Hawkinson et al. ......... 709/227

OTHER PUBLICATIONS

Http://www.eventhelix/RealtimeMantra/HardwareFaultTolerance.htm, Apr. 22, 2005.

* cited by examiner

*Primary Examiner*—Gerald Gauthier

(57) ABSTRACT

An Intelligent Network (IN) switch for use in a communications network. The Intelligent Network (IN) switch comprises N call application nodes capable of executing a plurality of primary-backup group (PBG) applications. Each of the plurality of primary-backup group applications comprises a primary call process and a backup call process, wherein the each primary call process executes an originating half-call model application and a terminating half-call model application associated with a call connection. Each primary call process comprises a primary call instance data (CID) table for storing call instance data used by the originating half-call model call application and the terminating half-call model application. Each backup call process comprises a backup call instance data (CID) table capable of being updated to mirror the call instance data stored in the primary CID table.

20 Claims, 9 Drawing Sheets

APPARATUS AND METHOD FOR CHECKPOINTING A HALF-CALL MODEL IN REDUNDANT CALL APPLICATION NODES

CROSS-REFERENCE TO RELATED APPLICATION AND CLAIM OF PRIORITY

The present invention is related to that disclosed in U.S. Provisional Patent Application Ser. No. 60/542,197, filed Feb. 4, 2004, entitled "Checkpointing Strategies for Half-Call Model". U.S. Provisional Patent Application Ser. No. 60/542,197 is assigned to the assignee of the present application. The subject matter disclosed in U.S. Provisional Patent Application Ser. No. 60/542,197 is hereby incorporated by reference into the present disclosure as if fully set forth herein. The present invention hereby claims priority under 35 U.S.C. §119(e) to U.S. Provisional Patent Application Ser. No. 60/542,197.

TECHNICAL FIELD OF THE INVENTION

The present invention relates generally to switching containing redundant call application nodes and, more specifically, to a checkpointing strategy for a half call model implemented on redundant call application nodes.

BACKGROUND OF THE INVENTION

In the traditional public switched telephone network (PSTN), the addition of a new service frequently required the upgrading of switching equipment and software. This was frequently an expensive and complex process. As new telecommunication services were developed and became widely available, the need to reduce the overhead for using services increased, along with the need to simplify maintenance and service upgrades. These needs led to the development of the Intelligent Network (IN) concept.

The IN concept provides a centralized system that separates services from switching equipment. Thus, a provider may introduce a new service without performing a major modification on multiple switches. In an IN architecture, separate service data is stored in a centralized database outside of IN switching nodes. An IN architecture also separates service programs (or service logic) and defines protocols that permit the interaction between switching systems and intelligent nodes.

The current state of IN development is Capability Set 2 (CS-2). CS-2 enables interworking between IN architectures to provide international services, allows management of both IN services and IN equipment, and supports enhanced IN services, such as mobility services. As in a CS-1 switch, all service requests received in a CS-2 IN switch are sent to an external application for processing.

Redundancy is an important requirement in real-time call processing systems, including Intelligent Network switches. When a call processing server or call application node fails, some backup mechanism should be available to handle existing calls and to process new calls. Redundancy is often implemented in hardware by having two central processing units (CPUs) executing the same set of machine instructions. If the main CPU fails, the backup CPU takes over.

However, there are disadvantages to providing call processing redundancy using redundant hardware. When hardware is upgraded to support more call processing capacity, new redundant hardware must also be added to backup the main hardware. Moreover, the use of customized fault tolerant hardware throughout the system is tremendously expensive and results in a competitive disadvantage.

Therefore, there is a need in the art for an improved Intelligent Network (IN) switch. In particular, there is a need for a CS-2 IN switch that has improved reliability with relying on hardware redundancy.

SUMMARY OF THE INVENTION

The present invention improves system reliability through the use of a checkpointing mechanism that implements software redundancy in an Intelligent Network (IN) switch. Software redundancy is provided by a primary call process (or application) that executes on a first server or call application node (CAN) and a backup call process (or application) that executes on a different second server or call application node. When a call reaches a stable state (e.g., the call is answered), critical call instance data (CID) is transferred from the primary call process to the backup call process. If the primary call process fails, the backup call process takes over and continues handling existing calls as well as new calls. The process of sending call instance data to the backup call process is referred to as checkpointing.

Implementing call processing redundancy using software has a number of advantages. When hardware is upgraded to support more call processing capacity, the existing call processing redundancy software at the application layer does not need to be changed as long as the operating system is not changed. If a new operating system is required, the only software layer that needs to be changed is the layer that interfaces with the new operating system. Also, call processing software redundancy allows telecom equipment suppliers to use third party hardware as part of their products, thus reducing costs of hardware development and shortening the time to market.

To address the above-discussed deficiencies of the prior art, it is a primary object of the present invention to provide an Intelligent Network (IN) switch for use in a communications network. According to an advantageous embodiment of the present invention, the Intelligent Network (IN) switch comprises N call application nodes capable of executing a plurality of primary-backup group (PBG) applications. Each of the plurality of primary-backup group applications comprises a primary call process and a backup call process, wherein the each primary call process executes an originating half-call model application and a terminating half-call model application associated with a call connection. Each primary call process comprises a primary call instance data (CID) table for storing call instance data used by the originating half-call model call application and the terminating half-call model application. Each backup call process comprises a backup call instance data (CID) table capable of being updated to mirror the call instance data stored in the primary CID table.

According to one embodiment of the present invention, the primary CID table comprises an originating access control function (ACF) call instance data (CID) record and an originating call control function (CCF) call instance data (CID) record associated with the originating half-call model application.

According to another embodiment of the present invention, the originating half-call model application comprises an originating ACF object capable of using at least one of the originating ACF CID record and the originating CCF CID record.

According to still another embodiment of the present invention, the originating half-call model application comprises an originating CCF object capable of using at least one of the originating ACF CID record and the originating CCF CID record.

According to yet another embodiment of the present invention, the primary CID table comprises a terminating access control function (ACF) call instance data (CID) record and a terminating call control function (CCF) call instance data (CID) record associated with the terminating half-call model application.

According to a further embodiment of the present invention, the terminating half-call model application comprises a terminating ACF object capable of using at least one of the terminating ACF CID record and the terminating CCF CID record.

According to a still further embodiment of the present invention, the terminating half-call model application comprises a terminating CCF object capable of using at least one of the terminating ACF CID record and the terminating CCF CID record.

According to a yet further embodiment of the present invention, the Intelligent Network (IN) switch further comprises a checkpointing system application capable of causing the backup CID table to be updated to mirror the call instance data stored in the primary CID table.

In one embodiment of the present invention, the checkpointing system application causes the backup CID table to be updated in response to a triggering event received by the primary call process.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged Intelligent Network (IN) switch.

Figure 1:
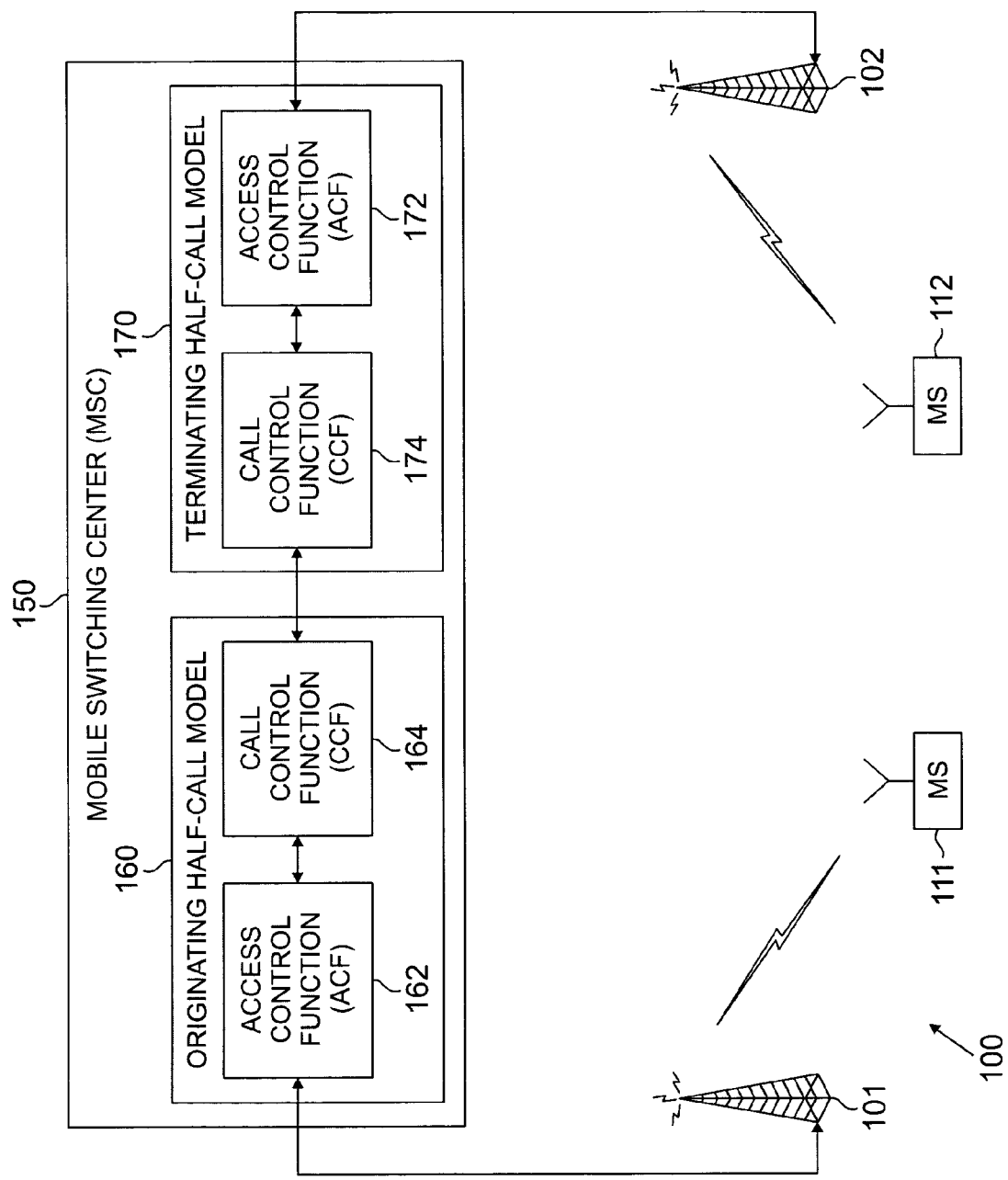
FIG. 1 illustrates a wireless network that comprises an Intelligent Network (IN) switch according to the principles of the present invention.

FIG. 1 illustrates wireless network 100 that comprises an Intelligent Network (IN) switch according to the principles of the present invention. Wireless network 100 comprises base station 101, base station 102 and mobile switch center (MSC) 150. Base station (BS) 101 is in communication with mobile station (MS) 111 and base station (BS) 102 is in communication with mobile station (MS) 112. Wireless network 100 may operate under a number of different wireless communication protocols. However, in the exemplary embodiment described herein, it shall be assumed that wireless network 100 is an IS-2000 (i.e., CDMA2000) wireless network.

In the descriptions that follow, it shall be assumed that MS 111 has originated a call that terminates at MS 112. Therefore, MS 111 will occasionally be referred to below as an "originating" mobile station and MS 112 will occasionally be referred to below as a "terminating" mobile station. Since MS 111 communicates with BS 101, BS 101 will occasionally be referred to below as an "originating" base station. Similarly, since MS 112 communicates with BS 102, BS 102 will occasionally be referred to below as a "terminating" base station.

It also should be noted that the present invention is not limited to use in wireless network switches. The embodiment of the present invention in MSC 150 is by way of illustration only. In other embodiments, the present invention may be implemented in conventional landline networks.

According to an exemplary embodiment, mobile switching center (MSC) 150 is an Intelligent Network (IN) switch that implements an Intelligent Network (IN) half-call model according to the Q.1124 ITU specification, which is hereby incorporated by reference as if fully set forth herein. MSC 150 comprises servers (or call application nodes) that execute originating half-call model application 160 and terminating half-call model application 170.

In the Intelligent Network (IN) half-call model, each basic call consists of two half-calls: 1) the originating half-call (represented by originating half-call model application 160)

and the terminating half-call (represented by terminating half-call model application 170). Each half-call consists of the following main entities: i) an Access Control Function (ACF) that is responsible for interfacing with the access side (e.g., line, trunk, mobile) and ii) a Call Control Function (CCF) that is responsible for controlling the call (e.g., digit collection, translation, routing, etc.), as well as interaction with the CCF of the other half-call. In FIG. 1, originating half-call model application 160 comprises ACF 162 and CCF 164 and terminating half-call model application 170 comprises ACF 172 and CCF 174.

Figure 2:
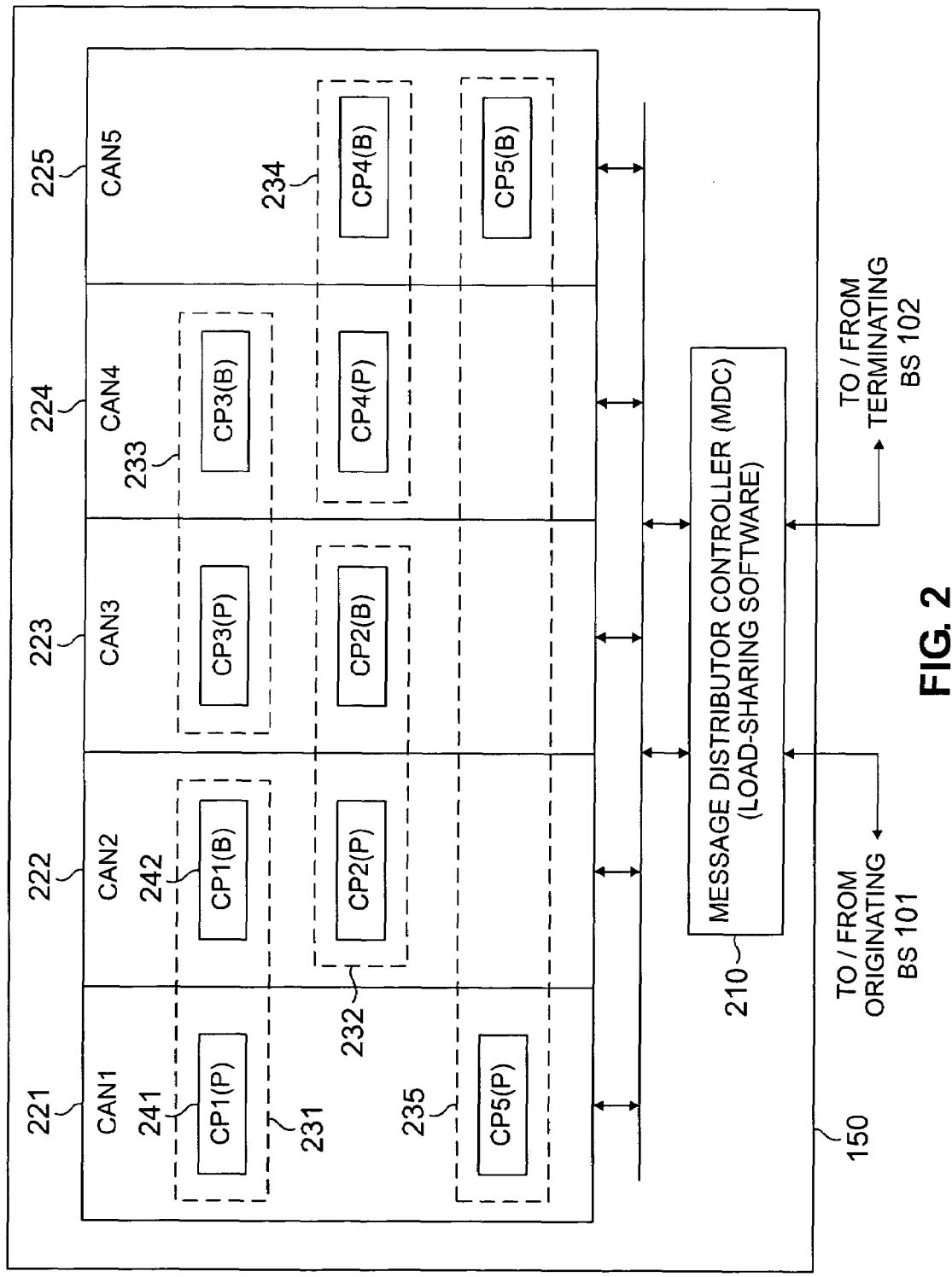
FIG. 2 illustrates the mobile switching center in FIG. 1 in greater detail according to an exemplary embodiment of the present invention.

FIG. 2 illustrates mobile switching center (MSC) 150 in greater detail according to an exemplary embodiment of the present invention. MSC 150 comprises message distributor controller (MDC) 210 and N call application nodes (CANs), including exemplary call application nodes 221-225. Call application node 221, call application node 222, call application node 223, call application node 224, and call application node 225 are arbitrarily labeled CAN1, CAN2, CAN3, CAN4 and CAN5, respectively.

The call process (CP) applications that implement the half-call models are organized into a load-sharing group (LSG). A mechanism for forming and using load-sharing groups is disclosed in U.S. patent application Ser. No. 10/038,878, filed on Dec. 31, 2001 and entitled "System and Method for Distributed Call Processing Using Load-Sharing Groups." The disclosure and teachings of U.S. patent application Ser. No. 10/038,878 are hereby incorporated by reference into the present application as if fully set forth herein.

Each load-sharing group (LSG) comprises two or more primary-backup group applications. Each primary-backup group (PBG) application comprises a primary call process (or application) and a backup call process (or application). FIG. 2 illustrates five primary-backup group (PBG) applications, namely PBG application 231, PBG application 232, PBG application 233, PBG application 234 and PBG application 235. PBG application 231 comprises primary call process 241 and backup call process 242, which are labeled CP1(P) and CP2(B), respectively. PBG applications 232-235 are similar to PBG application 231.

Thus, five call processes, CP1 through CP5, are active in the five call application nodes CAN1 through CAN5. PBG application 232 comprises primary call process CP2(P) and backup call process CP2(B). PBG application 233 comprises primary call process CP3(P) and backup call process CP3(B). PBG application 234 comprises primary call process CP4(P) and backup call process CP4(B). Finally, PBG application 235 comprises primary call process CP5(P) and backup call process CP5(B).

Only the primary member of each primary-backup group application is active in call processing. The backup member is continually checkpointed with call instance data (CID), so that the backup member mirrors the status of the primary member. However, the backup member only becomes active upon a failure of the primary member. Thus, originating half-call model application 160 and terminating half-call model application 170 are executed only by primary members, such as CP1(P), CP2(P), CP3(P), CP4(P) and CP5(P).

For redundancy purposes, the primary-backup groups are distributed across CAN1 through CAN5, so that the primary member and the backup member of each primary-backup group always reside on different call application nodes. By way of example, CP1(P) resides on CAN1 and CP1(B) resides on CAN2. Similarly, the primary call process members, CP1(P) through CP5(P), are distributed approximately evenly across CAN1 through CAN5, so that a failure of a call application node disrupts as few primary call processes as possible.

As explained in U.S. patent application Ser. No. 10/038, 878, the primary call processes join the load-sharing group, so that message distributor controller 210 can distribute call traffic across CAN1 through CAN5. If a new call application node (e.g., CAN6) is added to MSC 150 in order to improve capacity, the primary call process member(s) on the new CAN6 also join the load sharing group in order to receive call traffic.

Figure 3:
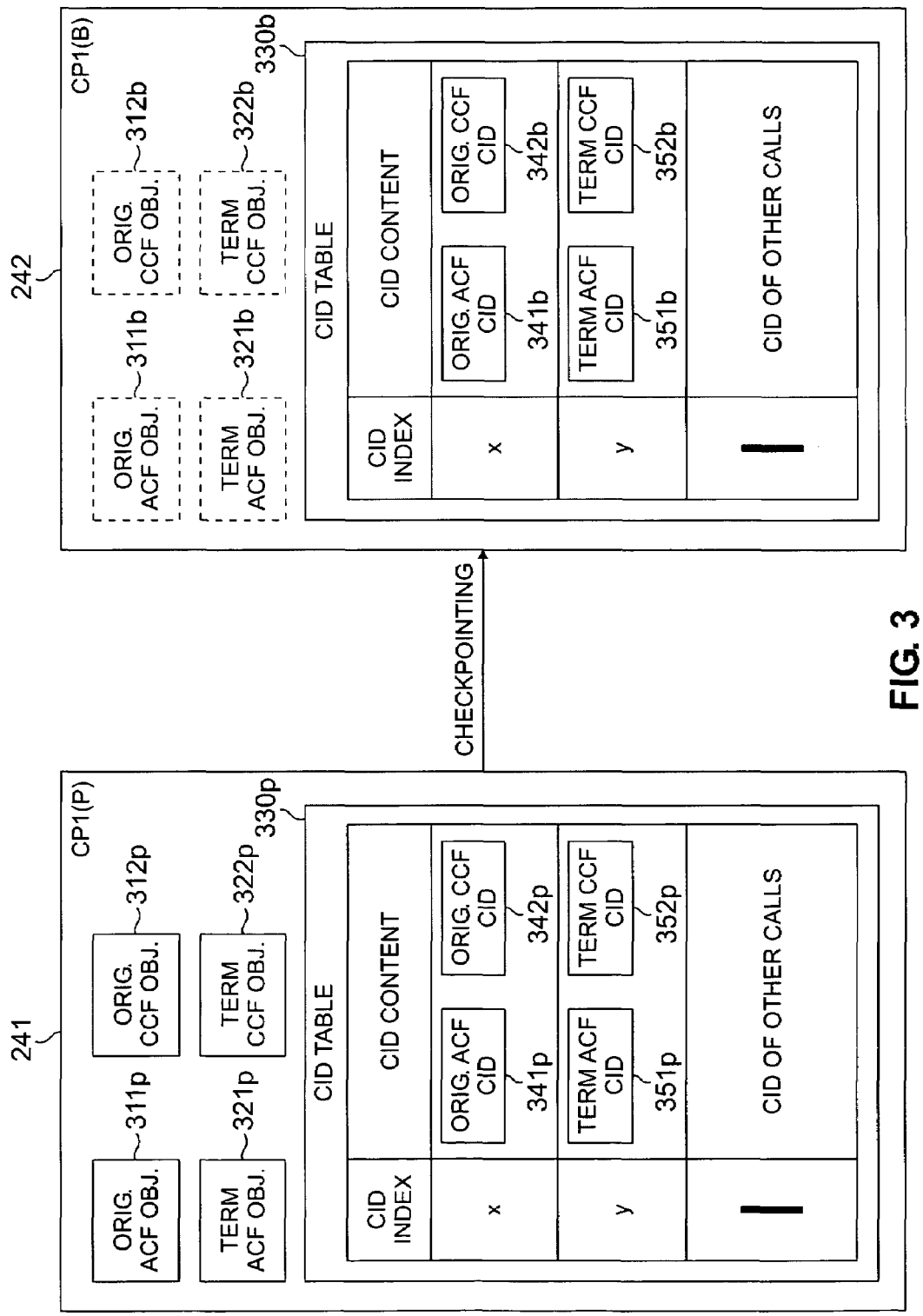
FIG. 3 illustrates an exemplary primary-backup group (PBG) application that implements a checkpointing operation according to the principles of the present invention.

FIG. 3 illustrates in greater detail exemplary primary-backup group (PBG) application 231, which implements a checkpointing operation according to the principles of the present invention. Primary call process CP1(P) comprises originating ACF object 311$p$, originating CCF object 312$p$, terminating ACF object 321$p$, terminating CCF object 322$p$, and call instance data (CID) table 330$p$. The lower case letter "p" after each reference number indicates "primary". Similarly, backup call process CP1(B) comprises originating ACF object 311$b$, originating CCF object 312$b$, terminating ACF object 321$b$, terminating CCF object 322$b$, and call instance data (CID) table 330$b$. The lower case letter "b" after each reference number indicates "backup".

ACF 162 and CCF 164 in originating half-call model application 160 are implemented by originating ACF object 311$p$ and originating CCF object 312$p$, respectively. ACF 172 and CCF 174 in terminating half-call model application 170 are implemented by terminating ACF object 321$p$ and terminating CCF object 322$p$, respectively. CID table 330$p$ stores data records containing the call status information used by originating ACF object 311$p$, originating CCF object 312$p$, terminating ACCF object 321$p$, and terminating CCF object 322$p$. By way of example, the call instance data (CID) associated with the call between originating MS 111 and terminating MS 112 is stored in the data records originating ACF CID 341$p$, originating CCF CID 342$p$, terminating ACF CID 351$p$, and terminating CCF CID 352$p$.

Although the CID records in CID table 330$b$ must be kept updated through checkpointing operations in order to mirror the CID records in CID table 330$p$, it is not necessary to create the objects in backup call process CP1(B) until a failure of primary call process CP1(P) occurs. Therefore, originating ACF object 311$b$, originating CCF object 312$b$, terminating ACF object 321$b$, and terminating CCF object 322$b$ are shown in dotted outline form.

The checkpointing operation for the IN half-call model is as follows. The primary call process and the backup call process both maintain a CID table. Each half-call has a separate index into the table, as shown in FIG. 3. When the call is stable (i.e., answered), each half-call is checkpointed independently. Each half-call CID contains subsystem CIDs (e.g., CCF CID, ACF CID). Each subsystem CID contains minimum subsystem information needed to recreate subsystem data structures on the backup process to handle call release requests. To link the two half-calls together, the originating CCF CID contains the identification of the terminating CCF and the terminating CCF CID contains the identification of the originating CCF.

In normal operating conditions, the primary call process is responsible for releasing the call, deleting the two half-call CIDs in its CID table and requesting the backup call process to delete the two half-call CIDs in the backup CID table. In rare cases where the primary call process fails after the call is answered, the backup call process will take over and use its CID table to recreate all subsystem objects needed to handle call disconnect request.

Figure 4:
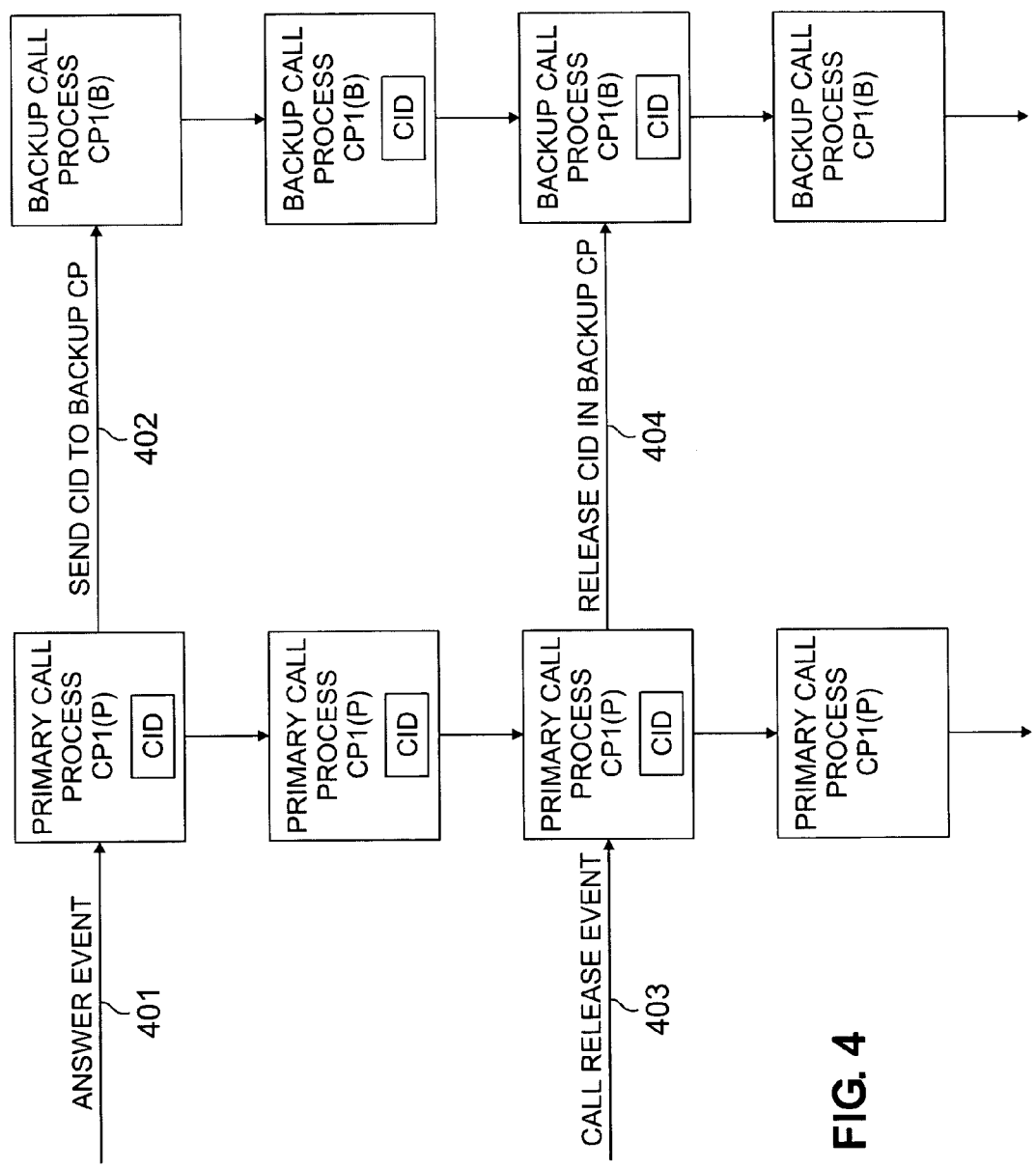
FIG. 4 illustrates checkpointing operations in the exemplary mobile switching center according to the principles of the present invention.

FIG. 4 illustrates checkpointing operations in mobile switching center (MSC) 150 according to the principles of the present invention. As noted above, the primary and backup call processes reside on different call application nodes. In case of a hardware failure or a software failure in the primary call process, the backup call process takes over and continues processing existing calls as well as new calls. Checkpointing is performed by a checkpointing system application (shown below in FIG. 7) that resides on the call application nodes. The checkpointing system application is triggered by certain events in MSC 150, such as Answer Event 401 or a Call Release Event 403.

Initially, a call is answered, resulting in an Answer Event notification 401 being received by primary call process CP1 (P). The checkpointing system application causes primary call process CP1(P) to send critical call instance data (e.g., billing information, allocated resources) in message 402 to the backup call process CP1(B). The CID comprises call status data needed to release the call correctly on the backup call process side. To reduce system overhead, the checkpointing system application does not checkpoint unanswered calls.

At some point, the call is released on the primary side, resulting in a Call Release Event notification 403 being received by primary call process CP1(P). The checkpointing system application causes primary call process CP1(P) to request the backup call process CP1(B) to release the checkpointed CID in message 404. Upon receiving a release request for a checkpointed call, the backup call process uses the checkpointed CID to recreate call processing data structures needed to release the call.

Figure 5:
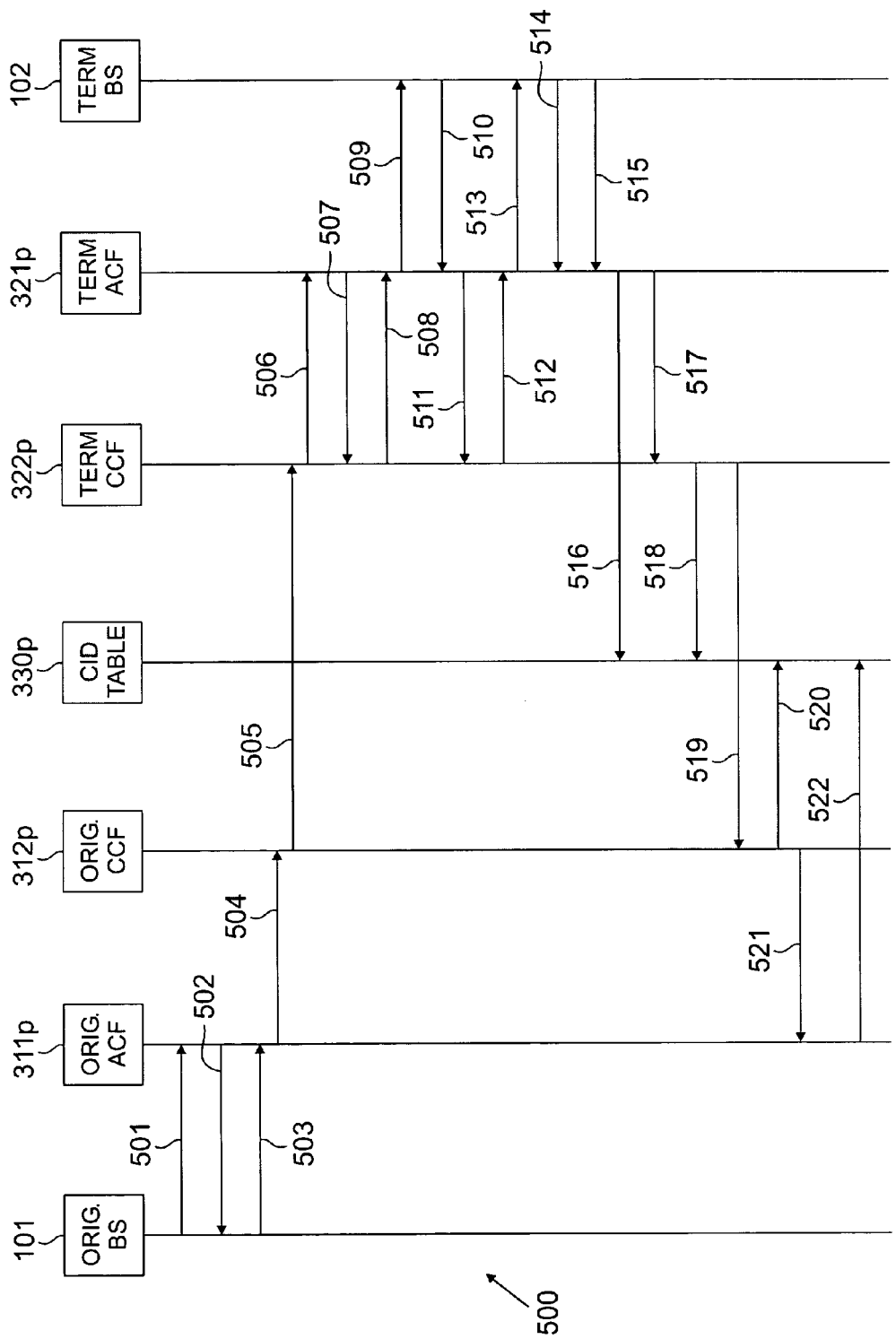
FIG. 5 is a message flow diagram illustrating intra-switch checkpointing operations according to the principles of the present invention.

FIG. 5 depicts message flow diagram 500, which illustrates MSC 150 checkpointing operations for a CDMA intra-switch MS-to-MS call according to the principles of the present invention. Messages 501-515 are some of the conventional messages that occur during call setup in an IS-2000 wireless network. Messages 501-515 include: CM Service Request message 501, Assignment Request message 502, Assignment complete message 503, Setup Request Indication message 504, Setup Request Indication message 505, Terminal Authorization Request message 506, Terminal Authorization Confirmation message 507, Select Facility message 508, Paging Request message 509, Paging Response message 510, Select Facility Confirmation message 511, Setup Request message 512, Assignment Request message 513, Assignment Complete message 514, and Connect message 515.

Checkpointing starts when terminating ACF object 321*p* receives Connect message 515 from terminating base station (BS) 102. In response, terminating ACF object 321*p* determines the CID index for terminating half-call model 170 and sends message 516 to primary CID Table 330*p* in order to save critical terminating ACF information in terminating ACF CID 351*p*. Terminating ACF object 321*p* then transmits Setup Confirmation message 517 to terminating CCF object 322*p*. In response, terminating CCF object 322*p* sends message 518 to CID Table 330*p* in order to save critical terminating CCF information in terminating CCF CID 352*p*.

At this point, the checkpointing operation sends the critical CID information in terminating ACF CID 351*p* to terminating ACF CID 351*b* in backup CID table 330*b*. The checkpointing operation also sends the critical CID information in terminating CCF CID 352*p* to terminating CCF CID 352*b* in backup CID table 330*b*.

Next, terminating CCF object 322*p* transmits Setup Response Confirmation message 519 to originating CCF object 312*p*. In response, originating CCF object 312*p* determines the CID index for originating half-call model 160 and sends message 520 to primary CID Table 330*p* in order to save critical originating CCF information in originating CCF CID 342*p*. Originating CCF object 312*p* then transmits Setup Response message 521 to originating ACF object 311*p*. In response, originating ACF object 311*p* sends message 522 to CID Table 330*p* in order to save critical originating ACF information in originating ACF CID 341*p*.

At this point, the checkpointing operation sends the critical CID information in originating ACF CID 341*p* to originating ACF CID 341*b* in backup CID table 330*b*. The checkpointing operation also sends the critical CID information in originating CCF CID 342*p* to originating CCF CID 342*b* in backup CID table 330*b*.

At a later point in time when the call is cleared by primary call process CP1(P), backup call process CP1(B) removes the two checkpointed half-call CIDs from backup CID table 330*b*.

Figure 6:
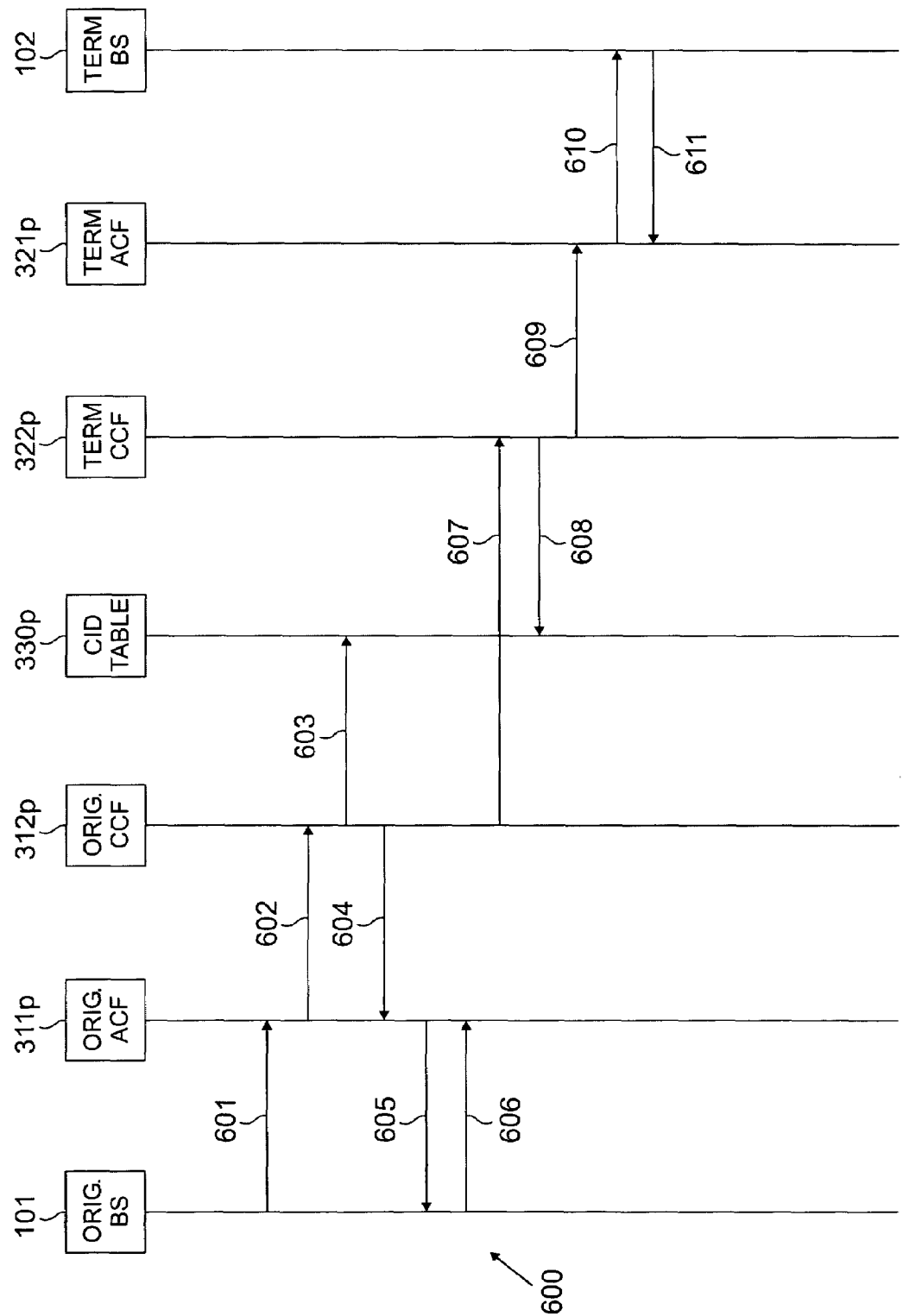
FIG. 6 is a message flow diagram illustrating the handling of a release request when the primary call process operates normally according to the principles of the present invention.

FIG. 6 depicts message flow diagram 600, which illustrates the handling of a release request when the primary call process operates normally according to the principles of the present invention. Initially, originating BS 101 transmits Clear Request message 601 to originating ACF object 311*p*. In response, originating ACF object 311*p* transmits Release Indication message 602 to originating CCF object 312*p*.

Next, originating CCF object 312*p* transmits message 603 to primary CID table 330*p*. This causes the deletion of the originating half-call CID in primary CID table 330*p* of the primary call process CP1(P). The checkpointing system application also causes the deletion of the originating half-call CID from backup CID table 330*b* of the backup call process CP1(B).

Originating CCF object 312*p* then transmits ACF Stop message 604 to originating ACF object 311*p*. Originating ACF object 311*p* transmits Clear Command message 605 to originating BS 101, which responds by transmitting Clear Complete message 606 back to Originating ACF object 311*p*. Originating CCF object 312*p* also transmits Release Request Indication message 607 to terminating CCF object 322*p*. The checkpointing system application causes terminating CCF object 322*p* to send message 608 to primary CID table 330*p* in order to delete the terminating half-call CID in CID table 330*p*. The checkpointing system application also causes the deletion of the terminating half-call CID from backup CID table 330*b*.

Thereafter, terminating CCF object 322*p* transmits Release Request message 609 to terminating ACF object 321*p*. Terminating ACF object 321*p* then transmits Clear Command message 610 to terminating BS 102, which responds by transmitting Clear Complete message 611 back to terminating ACF object 321*p*.

Figure 7:
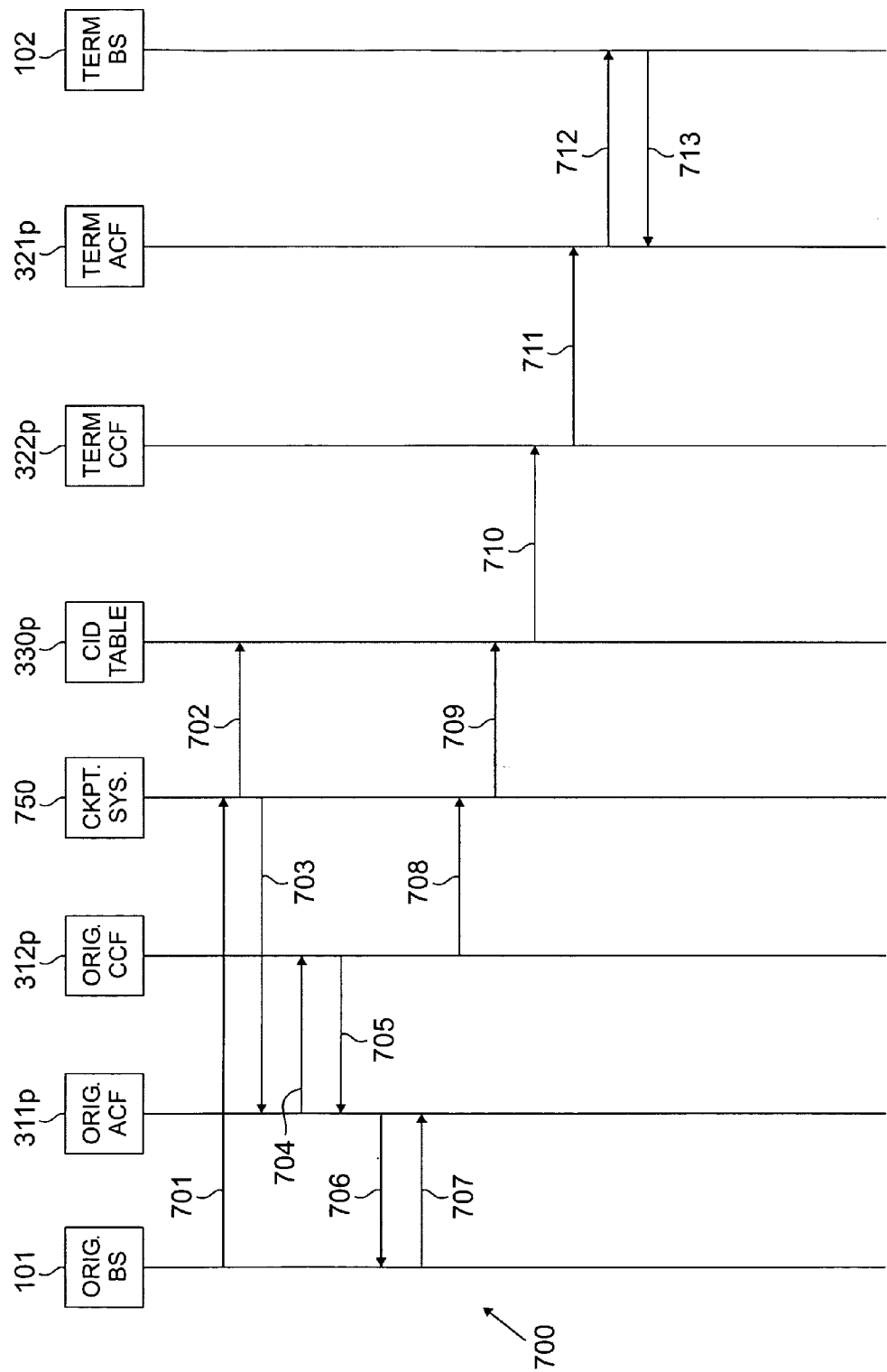
FIG. 7 is a message flow diagram illustrating the handling of a release request when the primary call process fails according to the principles of the present invention.

FIG. 7 depicts message flow diagram 700, which illustrates the handling of a release request message when the primary call process fails according to the principles of the present invention. In the event of a failure of the primary call process CP1(P), the backup call process CP1(B) takes over. In order to release allocated resource correctly and to send the correct messages to the base stations, the backup call process CP1(B) recreates the CCFs and ACFs using the checkpointed half-call CID information.

In FIG. 7, it is assumed that the Clear Request comes in from the originator. Thus, originating BS 101 transmits Clear Request message 701 to checkpointing system application 750. Checkpointing system application 750 transmits message 702 to CID table 330*p* in order to recreate the originating ACF and the originating CCF using the checkpointed originating half-call CID from backup CID table 330*b* (which becomes primary CID table 330*p* after failover).

Checkpointing system application 750 also transmits Clear Request message 703 to originating ACF object 311p, which responds by transmitting Release Indicator message 704 to originating CCF object 312p. Originating CCF object 312p then transmits ACF stop message 705 to originating ACF object 311p. Originating ACF object 311p transmits Clear Command message 706 to Originating BS 101, which responds by transmitting Clear Complete message 707 back to Originating ACF object 311p.

Originating CCF object 312p also transmits Release Request Indication message 708 to checkpointing system application 750. Checkpointing system application 750 transmits message 709 to CID table 330p in order to recreate the terminating ACF and the terminating CCF using the checkpointed terminating half-call CID from backup CID table 330b (which becomes primary CID table 330p after failover).

CID table 330p then transmits Release Request Indication message 710 to terminating CCF object 322p. Terminating CCF object 322p then transmits Release Request message 711 to terminating ACF object 321p. In response, terminating ACF object 321p transmits Clear Command message 712 to terminating BS 102, which replies by transmitting Clear Complete message 713 back to terminating ACF object 321p.

Figure 8:
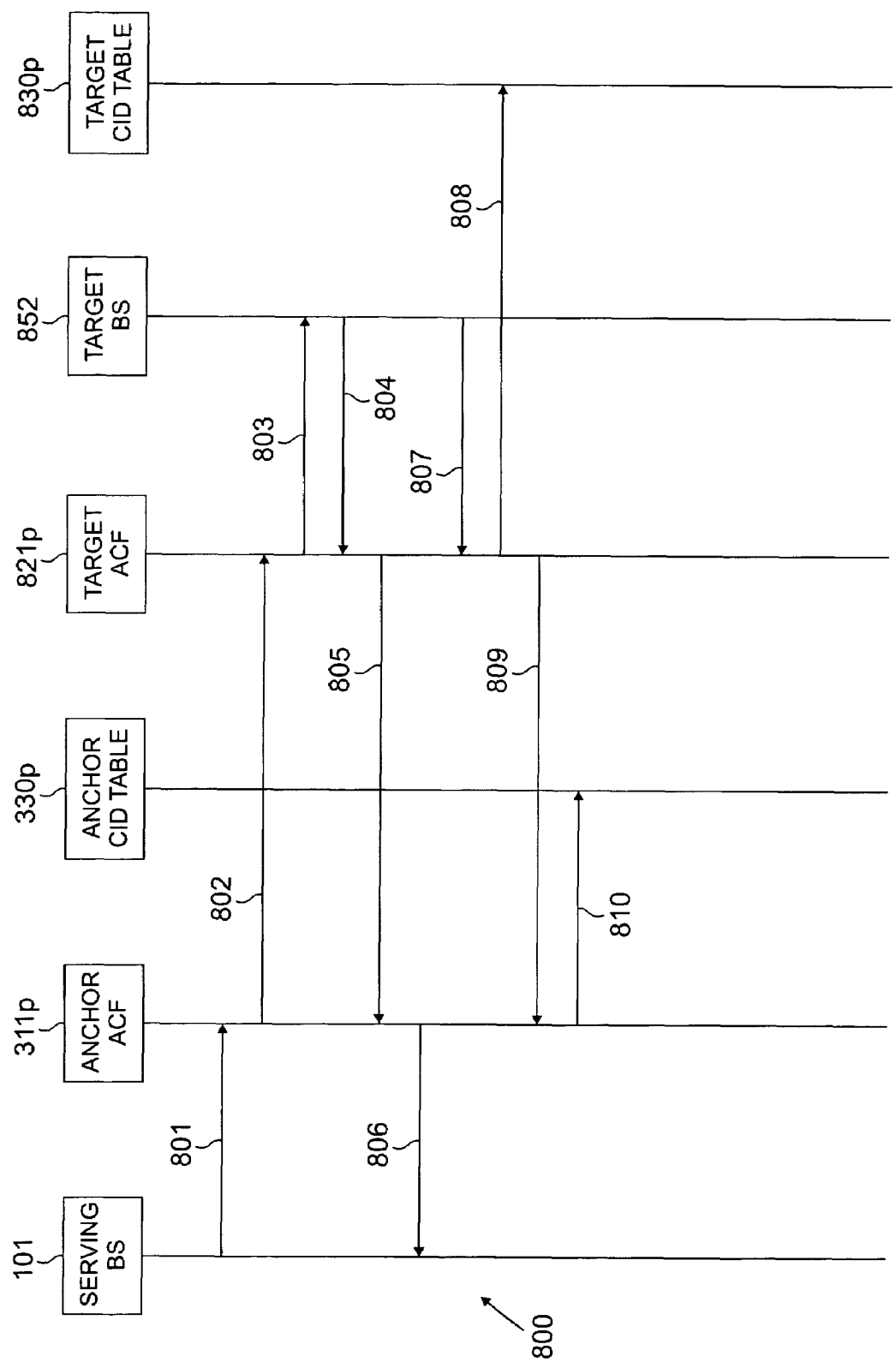
FIG. 8 is a message flow diagram illustrating an intersystem hard handoff operation according to the principles of the present invention.

FIG. 8 depicts message flow diagram 800, which illustrates an intersystem hard handoff operation according to the principles of the present invention. An intersystem hard handoff is performed after the basic call is established. As part of ordinary call checkpointing, it is assumed that the primary call process has already sent two half-call CIDs to the backup call process. One of those two CIDs must be updated to reflect newly allocated resources as a result of an intersystem hard handoff operation. FIG. 8 depicts the checkpointing flow for a CDMA voice call that is being handed off from MSC 150 to another target mobile switching center.

At the target MSC, the handoff is considered stable after the target MSC has received a Handoff Complete message from the target base station (BS). At anchor MSC 150, the handoff is considered stable after anchor MSC 150 has received an IS-41 Mobile on Channel message from the target MSC. Checkpointing is performed when the handoff is in a stable state.

Initially, serving BS 101 transmits Handoff Request message 801 to anchor ACF object 311p. Anchor ACF object 311p transmits Facility Directive 2 message 802 to target ACF object 821p. Target message ACF object 821p then transmits Handoff Request message 803 to target base station 852, which responds by transmitting Handoff Request Acknowledgement message 804 back to target ACF object 821p. In response, target message ACF object 821p transmits Facility Directive 2 message 805 to anchor ACF object 311p, which then transmits Handoff Command message 805 to service BS 101.

When the handoff operation is complete, target BS 852 transmits Handoff Complete message 807 to target ACF object 821p. Target ACF then transmits message 808 to target CIF table 830p in order to save the target ACF CID in target CID table 830p and to send it to the backup call process. Target ACF object 821p then transmit Mobile On Channel message 809 to Anchor ACF object 311p. In response, anchor ACF object 311p transmits message 810 to anchor CID table 330p in order to update anchor CID table 330p and update the half-call CID in the backup call process.

Figure 9:
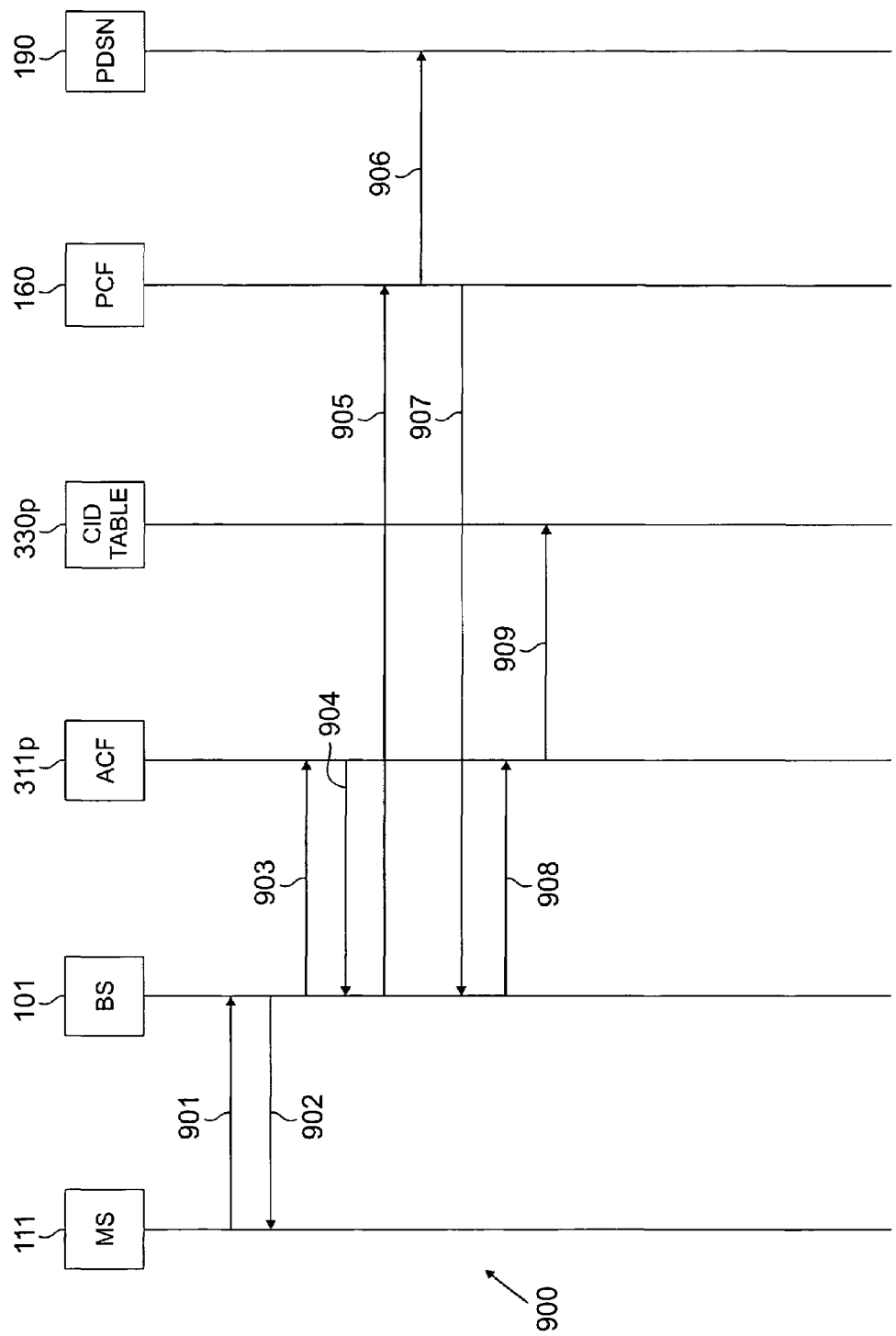
FIG. 9 is a message flow diagram illustrating checkpointing during a packet data call according to the principles of the present invention.

FIG. 9 depicts message flow diagram 900, which illustrates MSC 150 checkpointing operations during a packet data call according to the principles of the present invention. Messages 901-909 are some of the conventional messages that occur during a packet data call setup in an IS-2000 wireless network. Messages 901-909 include: Origination message 901, BS Acknowledgement Order message 902, CM service Request message 903, Assignment Request message 904, A9-Setup-A8 message 905, A10/A11 connection message 906, A9-Connect-A9 message 907 and Assignment Complete message 908. Since BS 101 does not send a Connect message to MSC 150 as in voice calls, a packet data call is considered stable and is checkpointed when MSC 150 receives Assignment Complete message 908 from base station 101. In response, ACF object 311p transmits message 909 to CID table 330p to save the ACF CID in CID table 330p and in the back up call process.

The present invention describes MSC checkpointing strategy for IN half-call model. Three checkpointing scenarios (basic mobile to mobile call, hard handoff, and packet data call) were used to demonstrate the half-call checkpointing concept. Advantageously, checkpointing according to the principles of the present invention enables telecommunication equipment vendors to avoid developing expensive and complex fault tolerant hardware, thus reducing costs and time to market. The present invention enables telecommunication equipment vendors to use third party hardware as part of their products, thus maintaining a flexible, scalable, and upgradeable architecture.

Although the present invention has been described with an exemplary embodiment, various changes and modifications may be suggested to one skilled in the art. It is intended that the present invention encompass such changes and modifications as fall within the scope of the appended claims.

What is claimed is:

1. For use in a communications network, an Intelligent Network (IN) switch comprising:
   N call application nodes capable of executing a plurality of primary-backup group (PBG) applications, each of said plurality of primary-backup group applications comprising a primary call process and a backup call process,
   wherein said each primary call process executes an originating half-call model application and a terminating half-call model application associated with a call connection, said each primary call process comprising a primary call instance data (CID) table for storing call instance data used by said originating half-call model call application and said terminating half-call model application, and wherein said each backup call process comprises a backup call instance data (CID) table capable of being updated to mirror said call instance data stored in said primary CID table.

2. The Intelligent Network (IN) switch as set forth in claim 1, wherein said primary CID table comprises an originating access control function (ACF) call instance data (CID) record and an originating call control function (CCF) call instance data (CID) record associated with said originating half-call model application.

3. The Intelligent Network (IN) switch as set forth in claim 2, wherein said originating half-call model application comprises an originating ACF object capable of using at least one of said originating ACF CID record and said originating CCF CID record.

4. The Intelligent Network (IN) switch as set forth in claim 3, wherein said originating half-call model application comprises an originating CCF object capable of using at least one of said originating ACF CID record and said originating CCF CID record.

5. The Intelligent Network (IN) switch as set forth in claim 4, wherein said primary CID table comprises a terminating access control function (ACF) call instance data (CID) record and a terminating call control function (CCF) call instance data (CID) record associated with said terminating half-call model application.

6. The Intelligent Network (IN) switch as set forth in claim 5, wherein said terminating half-call model application comprises a terminating ACF object capable of using at least one of said terminating ACF CID record and said terminating CCF CID record.

7. The Intelligent Network (IN) switch as set forth in claim 6, wherein said terminating half-call model application comprises a terminating CCF object capable of using at least one of said terminating ACF CID record and said terminating CCF CID record.

8. The Intelligent Network (IN) switch as set forth in claim 7, further comprising a checkpointing system application capable of causing said backup CID table to be updated to mirror said call instance data stored in said primary CID table.

9. The Intelligent Network (IN) switch as set forth in claim 8, wherein said checkpointing system application causes said backup CID table to be updated in response to a triggering event received by said primary call process.

10. A communication network comprising a plurality of Intelligent Network (IN) switches, each one of said plurality of IN switches comprising:
    N call application nodes capable of executing a plurality of primary-backup group (PBG) applications, each of said plurality of primary-backup group applications comprising a primary call process and a backup call process,
    wherein said each primary call process executes an originating half-call model application and a terminating half-call model application associated with a call connection, said each primary call process comprising a primary call instance data (CID) table for storing call instance data used by said originating half-call model call application and said terminating half-call model application, and wherein said each backup call process comprises a backup call instance data (CID) table capable of being updated to mirror said call instance data stored in said primary CID table.

11. The communication network as set forth in claim 10, wherein said primary CID table comprises an originating access control function (ACF) call instance data (CID) record and an originating call control function (CCF) call instance data (CID) record associated with said originating half-call model application.

12. The communication network as set forth in claim 11, wherein said originating half-call model application comprises an originating ACF object capable of using at least one of said originating ACF CD record and said originating CCF CID record.

13. The communication network as set forth in claim 12, wherein said originating half-call model application comprises an originating CCF object capable of using at least one of said originating ACF CID record and said originating CCF CID record.

14. The communication network as set forth in claim 13, wherein said primary CID table comprises a terminating access control function (ACF) call instance data (CID) record and a terminating call control function (CCF) call instance data (CID) record associated with said terminating half-call model application.

15. The communication network as set forth in claim 14, wherein said terminating half-call model application comprises a terminating ACF object capable of using at least one of said terminating ACF CID record and said terminating CCF CID record.

16. The communication network as set forth in claim 15, wherein said terminating half-call model application comprises a terminating CCF object capable of using at least one of said terminating ACF CID record and said terminating CCF CID record.

17. The communication network as set forth in claim 16, further comprising a checkpointing system application capable of causing said backup CID table to be updated to mirror said call instance data stored in said primary CID table.

18. The communication network as set forth in claim 17, wherein said checkpointing system application causes said backup CID table to be updated in response to a triggering event received by said primary call process.

19. A method for use in an Intelligent Network (IN) switch comprising N call application nodes capable of executing a plurality of primary-backup group (PBG) applications, each of the plurality of primary-backup group applications comprising a primary call process and a backup call process, the method comprising the steps of:
    executing in each primary call process an originating half-call model application associated with a call connection;
    executing in each primary call process a terminating half-call model application associated with the call connection;
    storing call instance data in a primary call instance data (CID) table associated with each primary call process, wherein the call instance data is used by the originating half-call model call application and the terminating half-call model application; and
    updating a backup call instance data (CID) table associated with each backup call process such that the backup CID table mirrors the call instance data stored in the primary CID table.

20. The method as set forth in claim 19, wherein the primary CID table comprises an originating access control function (ACF) call instance data (CID) record and an originating call control function (CCF) call instance data (CID) record associated with the originating half-call model application.

* * * * *

UNITED STATES PATENT AND TRADEMARK OFFICE
CERTIFICATE OF CORRECTION

PATENT NO. : 7,440,553 B2  Page 1 of 1
APPLICATION NO. : 11/029926
DATED : October 21, 2008
INVENTOR(S) : Hai Duong Nguyen It is certified that error appears in the above-identified patent and that said Letters Patent is hereby corrected as shown below:

Column 11, claim 12, line 50, delete "CD" and replace with --CID--.

Signed and Sealed this

Twenty-second Day of December, 2009

David J. Kappos
*Director of the United States Patent and Trademark Office*